United States Patent [19]
Johnson et al.

[11] 3,884,126
[45] May 20, 1975

[54] PROGRAMMABLE POSITIVE DISPLACEMENT PUMP

[75] Inventors: Wayne F. Johnson, Loudon; William A. Walker, Knoxville, both of Tenn.

[73] Assignee: The United States Energy Research and Development Administration, Washington, D.C.

[22] Filed: May 23, 1974

[21] Appl. No.: 472,930

[52] U.S. Cl.................................. 92/13.7; 92/13.1
[51] Int. Cl........................................... F01b 31/14
[58] Field of Search............. 92/13, 13.1, 13.4, 13.7

[56] References Cited
UNITED STATES PATENTS

| | | | |
|---|---|---|---|
| 2,910,875 | 11/1959 | Kuhnhausen | 92/13.7 |
| 2,958,237 | 11/1960 | Johnson | 92/13.7 |
| 3,443,521 | 5/1969 | Stender | 92/13.1 |
| 3,818,806 | 6/1974 | Fumagalli | 92/13.7 |

Primary Examiner—C. J. Husar
Assistant Examiner—Gregory La Pointe
Attorney, Agent, or Firm—Dean E. Carlson; David S. Zachry; Louis M. Deckelmann

[57] ABSTRACT

This invention relates to an apparatus for the loading of microliter quantities of chemical reagents or samples into receiving cavities. Its principal feature is the capability, at any time in the loading sequence, to dispense a different volume of the liquid by means of logic level commands. The apparatus is primarily adapted for loading miniature photometric analyzer rotors and may be computer controlled.

3 Claims, 1 Drawing Figure

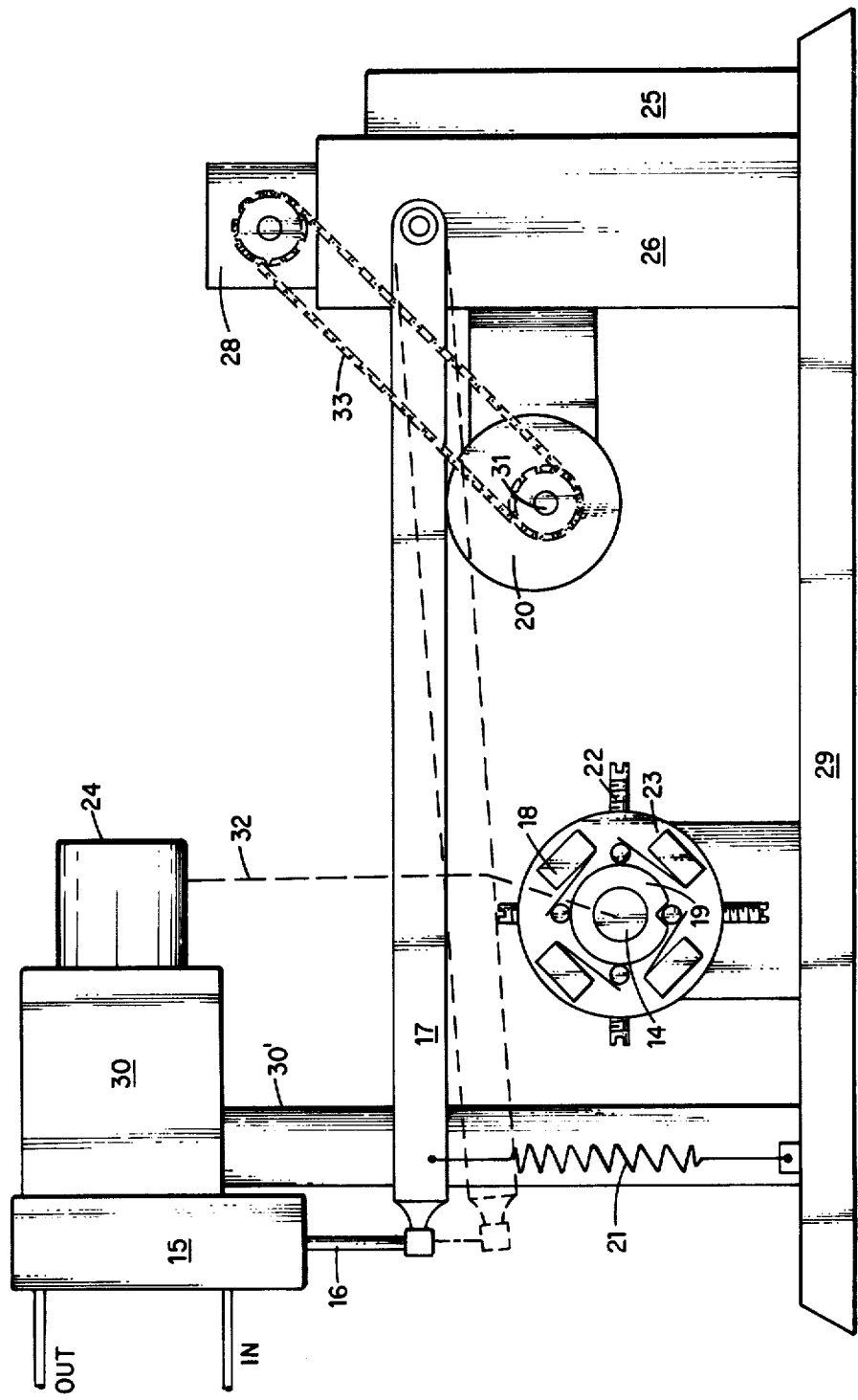

3,884,126

PROGRAMMABLE POSITIVE DISPLACEMENT PUMP

BACKGROUND OF THE INVENTION

This invention was made in the course of, or under, a contract with the United States Atomic Energy Commission.

In the Photometric Miniature Fast Analyzer Development Program at the Oak Ridge National Laboratory, a loader device is currently in use that automatically loads a 17-place rotor with sample and reagent, the reactants normally employed in such rotors. The analyzer is a compact analytical photometer of the rotary cuvette type designed to use small disposable cuvette rotors. Such a photometer is described in the U.S. application of Normal G. Anderson et al., Ser. No. 295,780(70), filed Oct. 6, 1972, now U.S. Pat. No. 3,798,459 and having a common assignee with the present application.

The above prior loader incorporates two commercially available pumps in the actual handling and dispensing of the liquids in a manner as shown and described in the U.S. application of Carl A. Burtis et al., Ser. No. 350,860, filed Apr. 13, 1973, now U.S. Pat. No. 3,854,508 and having a common assignee with the present application. In the operation of the above prior loader, both the sample and reagent are loaded into adjacent cavities in the rotor simultaneously. If neither the sample nor reagent volumes require changing in the course of the loading, the above prior loader performs well. However, for the multiple-reagent single-sample mode in which a number of tests are performed on a single sample, some of the various reagents must be loaded in non-identical volumes. This is necessitated because the different reagents are available from different manufacturers. The volume of reagent required for a glucose test, for example, is not necessarily the same as in a triglyceride test for identical sample volumes. In order to adjust the volume settings of the existing loader, tedious manual operation subject to error is necessary. If such changes are made by a clinical laboratory technician, there would be likelihood for error along with being prohibitively time consuming.

Thus, there exists a need for a practical way to automate the desired volume adjustment when needed or desired. The present invention was conceived to meet this need in a manner to be described below.

SUMMARY OF THE INVENTION

It is the primary object of the present invention to provide a liquid dispenser wherein the sample and reagent volumes are determined and metered thereby and further wherein the desired volume settings may be automatically programmable at any point in the rotor loading sequence.

It is another object of the present invention to provide a liquid dispenser or loader wherein the programming for the volume setting may be done using digital logic levels.

The above objects have been accomplished in the present invention by providing one or more pumps that can be individually programmed to operate in a positive displacement manner such that each pump, which includes means for selectively choosing the degree of displacement thereof as a function of the selected volume to be dispensed thereby, will dispense a selected volume for each stroke of the pump pin in a manner to be described hereinbelow.

BRIEF DESCRIPTION OF THE DRAWING

The single FIGURE in the drawing is a schematic illustration of the device for accomplishing the above objects.

DESCRIPTION OF THE PREFERRED EMBODIMENTS

In the single FIGURE, a displacement pump consisting of a closed cylinder 15 provided with a piston and with a uniform-diameter (piston) rod 16 extending downwardly therefrom is affixed to a support 30 mounted on a base 29 by means of a support post 30'. It is desired to programmably drive the displacement rod 16 to various preset extensions and return, thereby effecting the metering of different volumes out of the pump cylinder 15. This is accomplished by means of a generally horizontal arm 17 that is pivotally attached at one end thereof to a support 26 mounted on the base 29 and at its other end to the piston rod 16. A spring 21 connected between and to the arm 17 and to the base 29 exerts a downward force on the free end of the arm 17, and opposing this downward pull is a rotating cam 20. The cam 20 is mounted on and affixed to a rotatable shaft 31 which is supported by means of a suitable bracket mounted on the support 26. A motor 28 is provided which is supported by the support 26 and which is utilized to drive the shaft 31 and the cam 20 affixed thereto by means of suitable sprockets and a chain-link coupling 33. Rotation of the cam 20, therefore, drives the piston rod 16 into and out of the pump cylinder 15 in cooperation with the spring 21. The upper limit of travel of the arm 17 is always the same, being fixed by the largest radius of rotation of the cam 20. The downward limit of travel of the arm 17 is adjustable and programmable. A rotatable wheel 23 has stroke-limiting screws 22 extending radially outward different distances from the wheel circumference such that the downward stroke of the arm 17 is determined by which selected one of these screws the arm 17 strikes when the cam 20 permits such a downward stroke. It should be noted that more than the four stroke-limiting screws 22 shown in the drawing could be utilized and provided if such were desired.

The wheel 23 is affixed to a rotatable shaft 14 which is rotatably supported by means of a suitable bracket mounted on the base 29. The desired liquid is fed into the pump cylinder 15 by means of an inlet tube and is pumped out of the cylinder 15 by means of an outlet tube as shown in the drawing and the desired metered amount pumped out of the pump cylinder is determined by the pump stroke which is determined by which screw stop is contacted by the arm.

Before the pump action for the filling of a rotor station begins, a circuit 25 is interrogated and, if the screw stop 22 that corresponds to the desired volume to be dispensed is not under the arm 17, a drive motor 24, coupled to the shaft 14 by means of a mechanical coupling 32, is energized by the circuit 25 and rotates the shaft 14 and the affixed wheel 23 until the proper stroke-identifying microswitch 18 is identified by the digital logic within the circuit 25, at which time the motor 24 is deenergized and the desired stroke-limiting screw stop 22 is under the arm 17. A notched ring 19 is affixed to the shaft 14 and this ring is utilized to sequentially actuate the microswitches 18. It should be noted that the number of switches 18 utilized corresponds to the number of stroke-limiting screws 22 that are utilized. Each of the switches 18 is provided with an actuating spring arm with a roller mounted on the end thereof wherein the roller rides against the outside of the ring 19 or falls within the slot of the ring depending upon the position thereof. Thus, while the upward limit of travel of the arm 17 is always the same, its downward motion is stopped when it contacts the selected one of the screw stops 22 of the wheel 23. While the arm 17 is stopped by one of the screws 22, the cam 20 is free to continue turning until on its return it lifts the arm to return it to its uppermost position.

The circuit 25 consists simply of a selector switch for the stroke-limiting switches 18 and other necessary wiring for direct operation of the pump. In place of the selector switch, a matrix board or a digital computer could be wired to the pump to operate it. The input signals to operate the pump can all be digital logic levels, if such is desired.

The present invention has been tested with a dial indicator and the precision is ±1 mil. Its accuracy depends on how well the screw stops can be set and this can also be up to ±1 mil. The maximum stroke for a typical pump piston is 0.8 inch. The ±1 mil accuracy corresponds therefore to 0.125 percent of the full stroke volume. In practice, total volumes as low as 20 $\mu$liters have been achieved.

The present invention is not limited to a single-pump operation. If desired, a second pump cylinder 15 with an inlet and an outlet tube can be mounted on the support 30 just back of the one shown on the drawing. Such a pump cylinder would be provided with its own piston rod 16 which is coupled to a second operating arm 17 which in turn is pivotally attached to the support 26. Also, a second shaft 14 with another attached wheel 23 is mounted on the base 29 and is provided with its own stroke-limiting screws 22 for stopping the second pump operating arm 17. A second motor 24 and a second coupling 32 are provided for driving the second shaft 14. Both pumps are operated off the cam axle 31 which is provided with a second cam 20 affixed thereto wherein such a second cam is associated with the operating arm 17 of the second pump cylinder. Thus, the common cam axle 31 is driven by the single motor 28 such that the two pumps are actuated or operated together and the selected stroke of each pump may obviously be independently controlled, if such is desired, by providing independent control circuits 25 for selecting the stroke of each pump. Thus, one of the pumps can be utilized for sequentially dispensing a sample into respective cuvettes of an analyzer rotor, while the other pump can be utilized for sequentially dispensing a reagent into respective other cuvettes of the rotor, and the amount of liquid dispensed by each pump for each stroke thereof can be independently controlled as desired by means of a preselected program.

This invention has been described by way of illustration rather than by limitation and it should be apparent that it is equally applicable in fields other than those described.

What is claimed is:

1. A positive displacement pump for the loading of microliter quantities of chemical reagents or samples into receiving cavities, comprising a base, a closed pump cylinder provided with an inlet tube for supplying a desired liquid thereto and an outlet tube for dispensing a desired volume of said liquid therefrom, said cylinder further provided with a piston and a piston rod extending downwardly from said cylinder, a first support member extending above said base and affixed thereto, said pump cylinder being mounted on said support in spaced relation to said base, a second support member extending above said base and affixed thereto, said support members being widely spaced apart from each other, an actuating arm being affixed at one end thereof to the lower end of said piston rod and pivotally affixed at its other end to said second support member, a spring positioned between and affixed to said base and to said actuating arm adjacent to said one end for exerting a downward force to said one end of said arm, a first rotatable shaft provided with a cam affixed thereto, said shaft being rotatably supported by and above said base in such a position that said affixed cam bears against the underside of said actuating arm intermediate the ends thereof to effect a desired upper limit of travel of said arm as a function of the largest radius of rotation of said cam, a first motor mounted on the upper portion of said second support member, means for coupling said motor to said first shaft for effecting continuous rotation of said cam for thus driving said piston rod into and out of said pump cylinder; and means for selectively limiting the down stroke of said actuating arm by action of said spring comprising a second rotatable shaft provided with an attached wheel, said second shaft being rotatably supported by and above said base between said first shaft and said first support member, said wheel being provided with a plurality of stroke-limiting screws extending radially outward different distances from the wheel circumference, wherein a selected one of said screws functions as a stop for said pump-actuating arm during its downward stroke, a plurality of microswitches mounted on one side face of said wheel and each switch having a spring-operating arm provided with a roller on its end, said second shaft having a slotted ring affixed thereto wherein the slot of said ring is adapted to sequentially actuate each of said microswitches when the associated spring arm roller is urged into said slot, a second motor mounted on said first support member, a mechanical coupling for coupling said second motor to said second shaft, and means for energizing said second motor including means for selecting one of said microswitches such that said second motor rotates said second shaft until said selected microswitch is actuated to stop rotation of said second shaft by said second motor and the desired one of said stroke-limiting screws is directly beneath said pump-actuating arm whereby a desired volume of said liquid is pumped out of said cylinder outlet tube for each stroke of said pump.

2. The pump set forth in claim 1, wherein a second cam is affixed to said first shaft and a second pump identical to said first pump is mounted on said base except the first motor coupled by said coupling means to said first shaft of said first pump are utilized for simultaneously rotating the respective cams of both pumps for operating the respective piston-rod-actuating arms of both pumps between their respective stroke-limiting screws and the upper limit of travel of each pump-actuating arm.

3. The pump set forth in claim 1, wherein the number of said stroke-limiting screws mounted on said wheel is four and the number of said microswitches is four.

* * * * *